US010702950B2

(12) United States Patent
Galvagnini et al.

(10) Patent No.: US 10,702,950 B2
(45) Date of Patent: Jul. 7, 2020

(54) MACHINE FOR THE LASER WORKING OF PROFILES AND METHOD FOR CARRYING OUT AN INCLINED CUTTING OPERATION ON A PROFILE BY MEANS OF THIS MACHINE

(71) Applicant: ADIGE S.p.A., Levico Terme (Trento) (IT)

(72) Inventors: Paolo Galvagnini, Nogareda (IT); Carlo Micheli, Lona Lases (IT); Sergio Nicoletti, Levico Terme (IT); Martijn Van Opbergen, Civezzano (IT)

(73) Assignee: ADIGE S.p.A., Levico Terme (Trento) (IT)

( * ) Notice: Subject to any disclaimer, the term of this patent is extended or adjusted under 35 U.S.C. 154(b) by 328 days.

(21) Appl. No.: 15/736,850

(22) PCT Filed: Jun. 13, 2016

(86) PCT No.: PCT/IB2016/053464
§ 371 (c)(1),
(2) Date: Dec. 15, 2017

(87) PCT Pub. No.: WO2016/203357
PCT Pub. Date: Dec. 22, 2016

(65) Prior Publication Data
US 2018/0193957 A1    Jul. 12, 2018

(30) Foreign Application Priority Data
Jun. 16, 2015   (IT) .................... 102015000024194

(51) Int. Cl.
*B23K 26/38*   (2014.01)
*B23K 26/08*   (2014.01)

(52) U.S. Cl.
CPC .......... *B23K 26/38* (2013.01); *B23K 26/0846* (2013.01); *B23K 26/0884* (2013.01)

(58) Field of Classification Search
CPC . B23K 26/38; B23K 26/0846; B23K 26/0884
(Continued)

(56) References Cited

U.S. PATENT DOCUMENTS

| 8,527,084 B2 * | 9/2013 | Maurer | B23K 26/073 |
| | | | 700/160 |
| 2005/0230370 A1 * | 10/2005 | Kameyama | B23K 26/046 |
| | | | 219/121.72 |
| 2015/0360318 A1 | 12/2015 | Dimeco | |

FOREIGN PATENT DOCUMENTS

| EP | 2818271 A1 | 12/2014 |
| WO | 2010/094449 A1 | 8/2010 |
| WO | 2014/122524 A1 | 8/2014 |

OTHER PUBLICATIONS

International Search Report and Written Opinion dated Sep. 12, 2016, from International Application No. PCT/IB2016/053464, 10 pages.

* cited by examiner

*Primary Examiner* — Jennifer C Chiang
(74) *Attorney, Agent, or Firm* — Meunier Carlin & Curfman LLC

(57) ABSTRACT

A machine and method for laser working of profiles and in particular for carrying out an inclined cutting operation on profiles are provided. Before working operation, a support and guide device are positioned in a given starting position along the longitudinal axis of the profile with respect to a working head. During working operation, the support and guide device are moved along the longitudinal axis integrally with a feeding device, that is with the profile, so as to keep constant the extent of the projection of the profile from (Continued)

the support and guide device. Integral movement of the support and guide device with the feeding device is limited to the portion of the movement of the feeding device which is required to compensate for tilting movements of the working head about an axis of oscillation.

4 Claims, 3 Drawing Sheets

(58) Field of Classification Search
USPC .................................................. 219/121.72
See application file for complete search history.

MACHINE FOR THE LASER WORKING OF PROFILES AND METHOD FOR CARRYING OUT AN INCLINED CUTTING OPERATION ON A PROFILE BY MEANS OF THIS MACHINE

The present invention relates to a machine for the laser working of profiles, in particular a machine for the laser cutting of profiles, as specified in the preamble of independent claim 1. According to a further aspect, the present invention relates to a method for carrying out an inclined cutting operation on a profile using a machine of the type identified above.

In the description and the claims which follow, the term "profile" is used to identify any elongated manufactured product having (apart from manufacturing tolerances) a uniform cross-section along its longitudinal axis, wherein the cross-section may indifferently be a closed hollow cross-section (for example of circular, rectangular or square shape) or an open cross-section (for example a flat cross-section or a cross-section in the shape of an L, C or U etc.). Furthermore, the terms "longitudinal" and "transverse" are used to identify the direction of the longitudinal axis of the profile and a direction perpendicular to the longitudinal direction, respectively. Furthermore, the expression "inclined cutting operation" is to be understood to mean a cutting operation carried out with the working head, and therefore the laser beam emitted by the same, oriented not perpendicularly to the surface of the piece being worked.

The invention arises from the need to improve the way of carrying out an inclined cutting operation on a relatively flexible profile, i.e. on a profile having a relatively low stiffness in bending, such as for example a flat profile, by means of a machine for the laser working of profiles such as the one described below with reference to FIG. 1 of the attached drawings.

As shown in FIG. 1, the machine comprises a working head 10 adapted to carrying out a laser working operation (in particular a cutting operation) on a profile P, and a support and guide device 12, commonly known as "steady rest", for supporting and guiding the profile P while the latter is being fed along a longitudinal axis x by a feeding device (not shown). The support and guide device 12 typically comprises a first pair of rollers 16, which are mounted so as to be freely rotatable about respective axes of rotation oriented horizontally and parallel to each other, and a second pair of rollers 18, which are mounted so as to be freely rotatable about respective axes of rotation oriented vertically and parallel to each other. The rollers of each pair of rollers 16 and 18 can be moved towards each other or away from each other so as to adapt to the shape and the dimensions of the cross-section of the profile P being worked and thus allow adequate support for the profile itself. Typically, in a machine for the laser working of profiles such as the one briefly described above with reference to FIG. 1, the degrees of freedom of the various components of the machine are as follows. The working head 10 is shiftable both in a vertical direction and in a transverse direction, so as to be movable with two degrees of freedom in a transverse vertical plane, i.e. in a plane perpendicular to the longitudinal axis x of the profile P. Furthermore, the working head 10 can be rotated about a transverse axis of oscillation (indicated t in FIG. 1). The feeding device makes it possible both to move the profile P along the longitudinal axis x (feeding movement) and to rotate the profile P about the longitudinal axis x. Finally, the support and guide device 12, together with the pairs of rollers 16 and 18, is movable along the longitudinal axis x and is also rotatable about the longitudinal axis x so as to be able to rotate together with the profile P about this axis.

According to the prior art, a chamfering operation, for example for making a flared hole H, is performed by first positioning the support and guide device 12 in such a position as not to interfere, during the operation, with the working head 10 and then, with the support and guide device 12 kept stationary in this position, by suitably moving the profile P (by means of the feeding device) and the working head 10. In this way, during the working operation the profile P projects to a variable extent from the support and guide device 12 towards the working head 10. More precisely, the extent of the projection of the profile P from the support and guide device 12 (that is to say, the distance, measured along the longitudinal axis x, between the centre of the working area on the profile P and the line joining the axes of the rollers 16 of the support and guide device 12) will vary, as shown in FIG. 1, between a maximum value A, when the working head 10 is inclined by the maximum angle in the opposite direction from the support and guide device 12, and a minimum value B, when the working head 10 is inclined by the maximum angle towards the support and guide device 12. In case of working on a flexible profile, the latter will bend to a greater or lesser extent during working, depending on the extent of its projection from the support and guide device 12. Consequently, the geometry obtained (of which an example is shown in FIGS. 2A and 2B of the attached drawings) will be different from the design geometry, and in particular will not be symmetrical with respect to the axis of the hole H (indicated z), since the inclination of the flaring will be greater when the bending deformation of the profile P being worked is smaller, i.e. when the projection of the profile P from the support and guide device 12 is smaller, and smaller when the bending deformation of the profile P being worked is greater, i.e. when the projection of the profile P from the support and guide device 12 is greater.

It is therefore an object of the present invention to overcome the drawbacks of the prior art discussed above, by increasing the precision with which an inclined cutting operation can be carried out on a flexible profile by means of a laser working machine.

This and other objects are fully achieved, according to a first aspect of the present invention, thanks to a machine for the laser working of profiles, having the characteristics specified in the annexed independent claim 1 and, according to a further aspect of the present invention, thanks to a method for carrying out an inclined cutting operation on a profile by means of a laser working machine, comprising the steps specified in the annexed independent claim 3.

Advantageous embodiments of the invention are the subject of the dependent claims, the content of which is to be understood as forming an integral and integrating part of the following description.

In brief, the invention is based on the idea of carrying out the inclined cutting operation by initially positioning the support and guide device in a given starting position with respect to the working head along the longitudinal axis and then, during the entire operation, moving the support and guide device along the longitudinal axis integrally with the feeding device (said integral movement of the support and guide device with the feeding device being limited to that portion of the movement of the feeding device which is required to compensate for tilting movements of the working head about the axis of oscillation), i.e. integrally with the profile being worked, so as to keep the extent of the projection of the profile from the support and guide device constant during the working operation. Since the extent of the projection of the profile being worked from the support and guide device remains constant during the working operation (or rather during those stages of the working operation in which the feeding device is moved along the longitudinal axis to compensate for the tilting movement of the working head about the axis of oscillation), as a result of the support and guide device being moved integrally with the feeding device, and therefore with the profile being worked, the extent of the bending of the profile in the working area on which the working head is acting remains constant during the working operation. This makes it possible, having previously measured the extent of the bending, to compensate for the bending and thus obtain a more precise working operation and especially, in the case of making a flared hole, a flaring symmetrical with respect to the axis of the hole.

Further characteristics and advantages of the invention will become clear from the detailed description which follows, provided purely by way of non-limiting example with reference to the annexed drawings, in which.

The machine and the method of the present invention are described and illustrated here with reference to their application to the making of a flared hole in a flat profile, but it is clear that the invention can also be used to carry out other types of working operation which require an inclined cutting step and/or to carry out these working operations on profiles of different shape.

Figure 1:
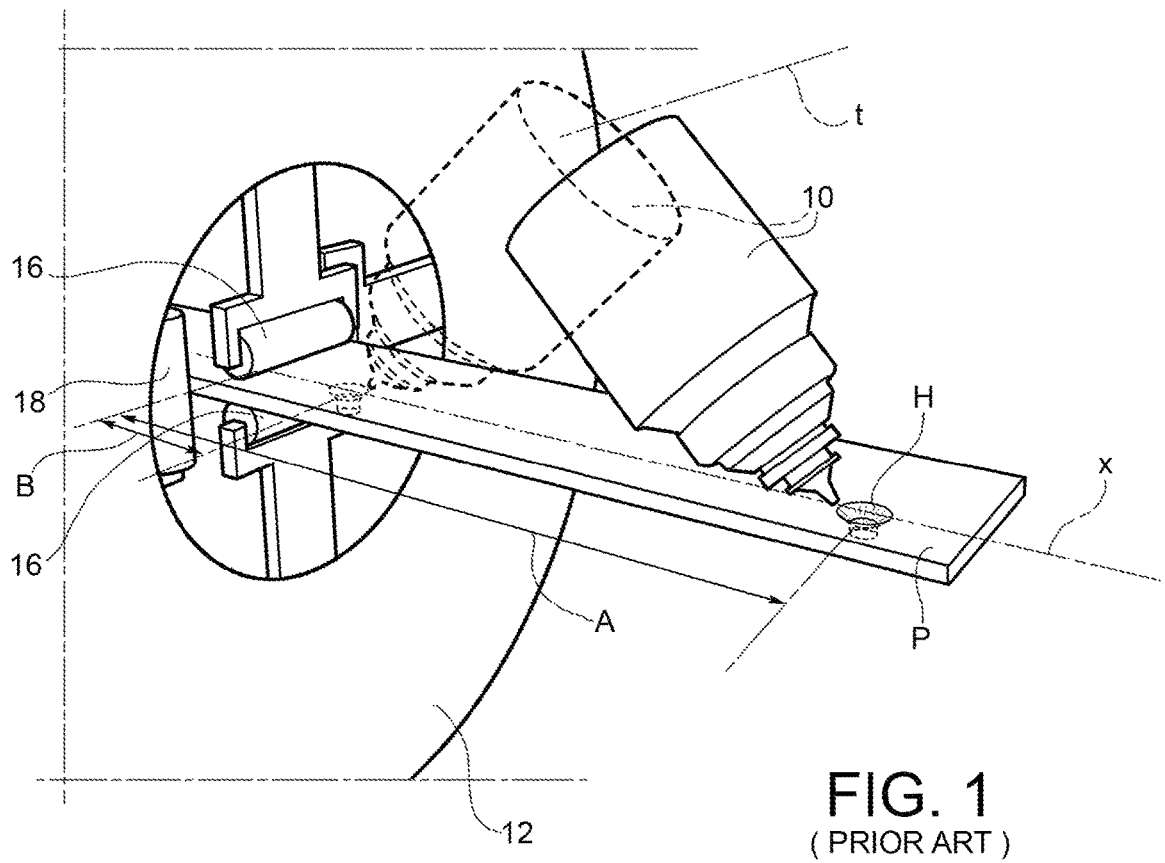
FIG. 1 is a perspective view which schematically shows how a flared hole in a flat profile is made by a laser working machine according to the prior art.
Figure 2A:
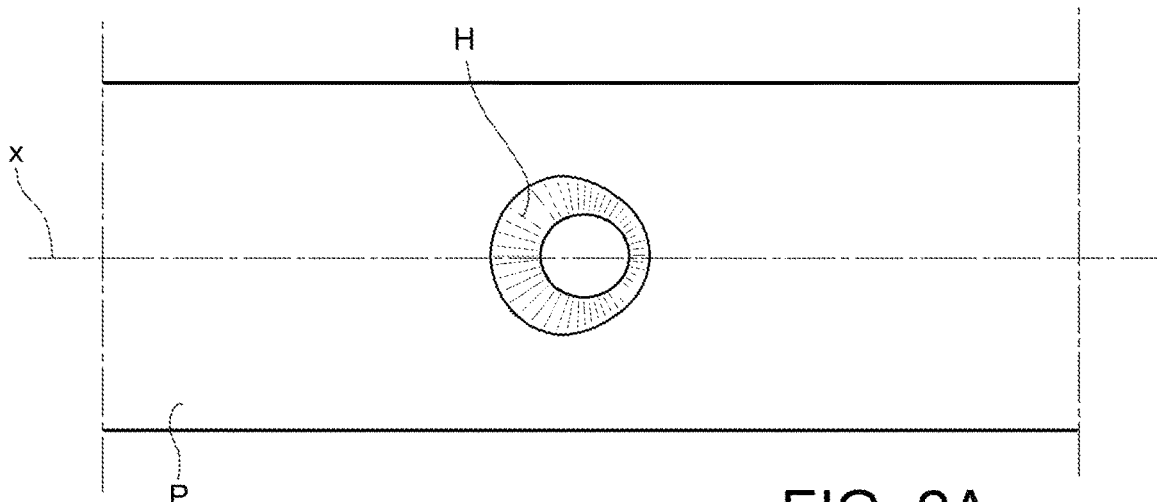
FIGS. 2A and 2B show, respectively, in plan view from above and in side view, an example of a flared hole in a flat profile made according to the prior art.
Figure 2B:
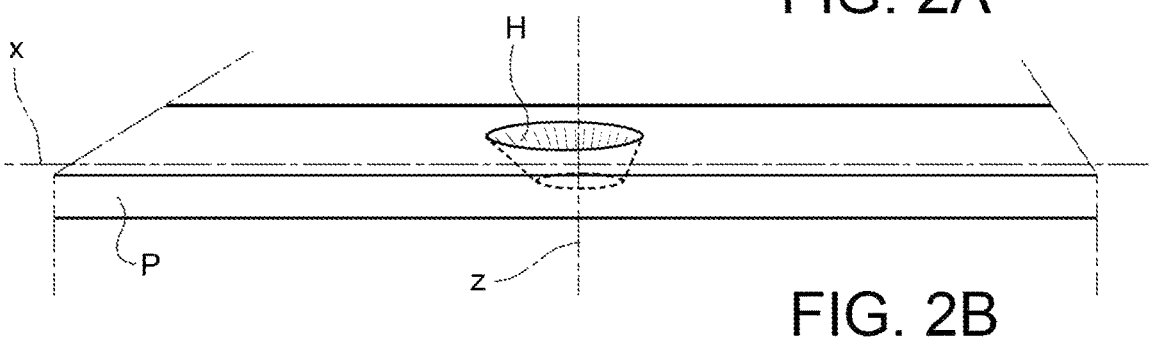
Figure 3:
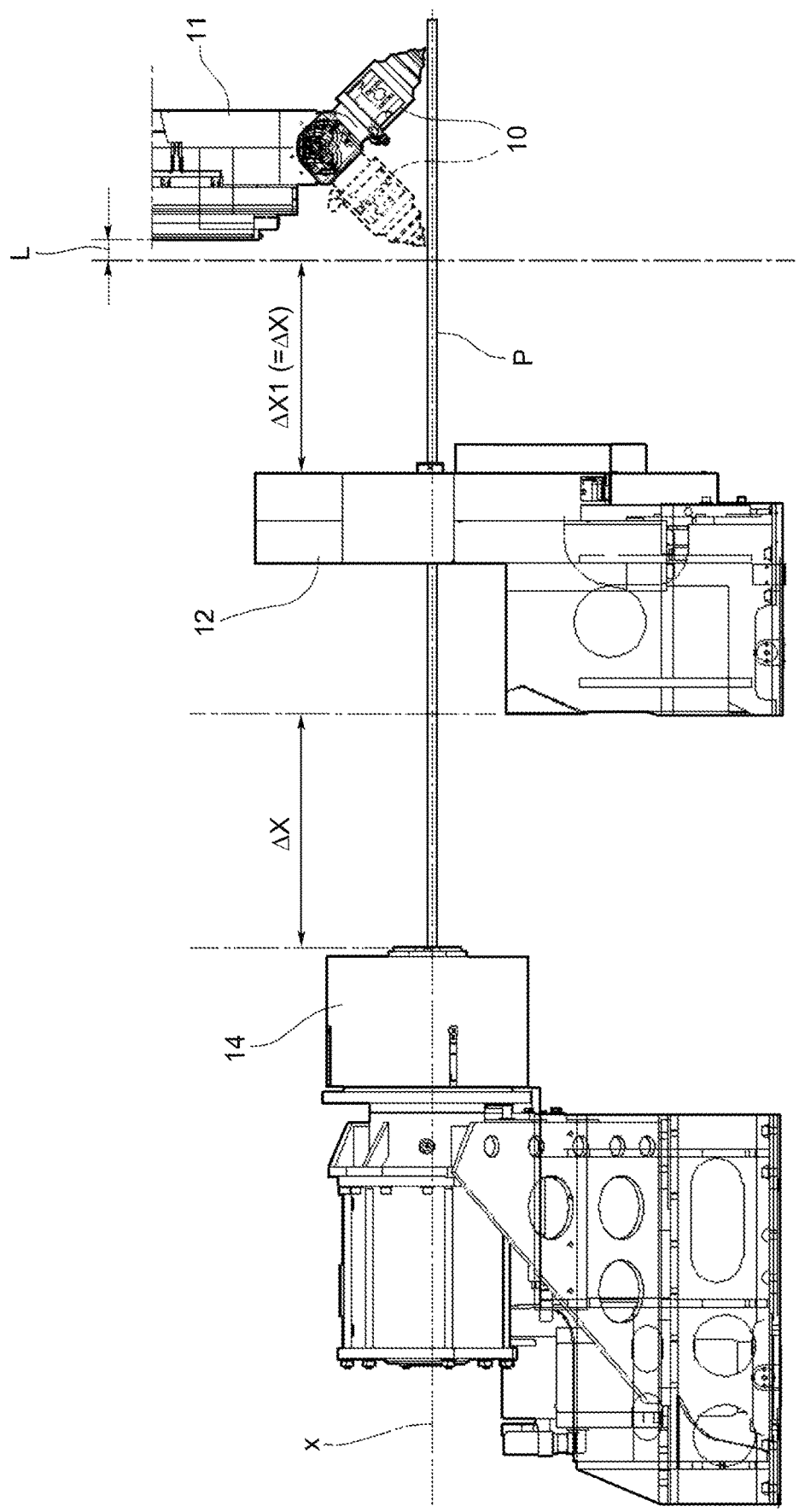
FIGS. 3 and 4 are a side view and a perspective view, respectively, which schematically show how a flared hole in a flat profile is made by a laser working machine according to the present invention.
Figure 4:
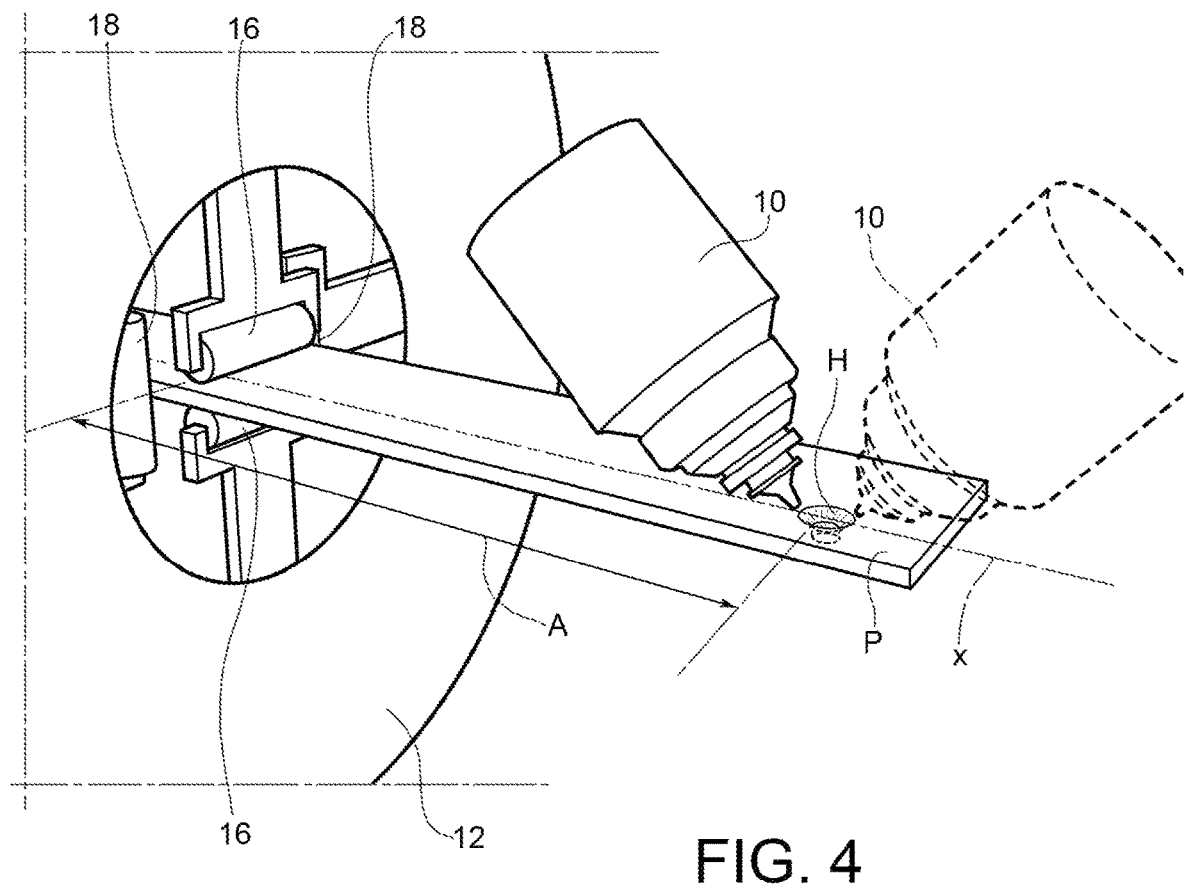
Figure 5:
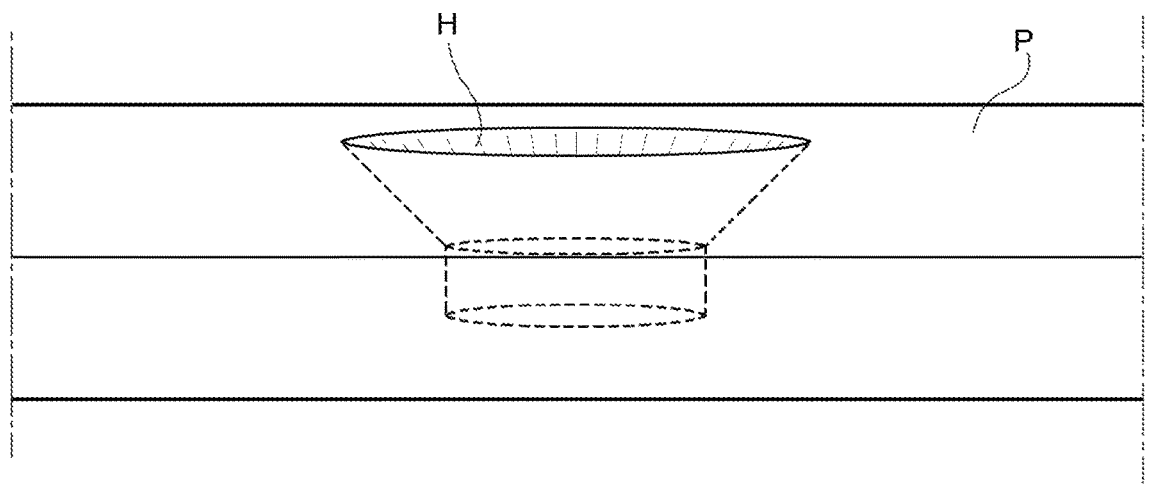
FIG. 5 is a side view which shows an example of a flared hole in a flat profile made with a machine and a method according to the present invention.

With reference to FIGS. 3-5, where which parts and elements identical or corresponding to those in FIG. 1 have been assigned the same reference numbers, a machine for the laser working of profiles according to an embodiment of the present invention comprises, in a per-se-known manner, a working head 10 arranged to emit a focussed laser beam for carrying out a working operation (in particular a cutting operation) on a profile P extending along a longitudinal axis x, a head-carrying structure 11 on which the working head 10 is mounted, a feeding device 14 for moving the profile P by translation along the longitudinal axis x and/or by rotation about the longitudinal axis x, and a support and guide device 12 for supporting and guiding the profile P while the latter is fed by the feeding device 14 towards the working head 10. In the embodiment illustrated, the support and guide device 12 comprises a first pair of rollers 16, which are mounted so as to be freely rotatable about respective axes of rotation oriented horizontally and parallel to each other, and a second pair of rollers 18, which are mounted so as to be freely rotatable about respective axes of rotation oriented vertically and parallel to each other. The rollers of each pair of rollers 16 and 18 can be moved towards each other or away from each other so as to adapt to the shape and dimensions of the cross-section of the profile P being worked and thus allow adequate support for the profile itself.

It must, however, be emphasised that the structure of the machine components mentioned above, i.e. the working head 10, the support and guide device 12 and the feeding device 14, are not the subject of the present invention and therefore the present invention is not to be understood to be limited to the particular structure of the above-mentioned components provided here.

The working head 10 is shiftable both in a vertical direction and in a transverse direction, so as to be movable with two degrees of freedom in a transverse vertical plane, i.e. in a plane perpendicular to the longitudinal axis x of the profile P. The working head 10 can also rotate about a transverse axis of oscillation (indicated t in FIG. 1) between a position of maximum inclination towards the support and guide device 12 (rotation in a clockwise direction, with respect to the point of view of the observer of FIG. 3) and a position of maximum inclination away from the support and guide device 12 (rotation in an anticlockwise direction, with respect to the point of view of the observer of FIG. 3). According to an embodiment, the working head 10 can also rotate about a further axis of oscillation (not shown) perpendicular to the axis of oscillation t.

As stated above, the feeding device 14 makes it possible both to move the profile P along the longitudinal axis x (feeding movement) and to rotate the profile P about the longitudinal axis x. Finally, the support and guide device 12 is movable along the longitudinal axis x and is also rotatable about the longitudinal axis x for rotating together with the profile P about this axis.

The movements of the working head 10, of the support and guide device 12 and of the feeding device 14 (and therefore of the profile P being worked) are controlled by an electronic control unit (not shown) which manages the operation of the machine. Depending on the working cycle to be carried out, the electronic control unit controls the movements of the above-mentioned components according to predetermined logics.

In the event that the machine has to make a flared hole H in the profile P, or more generally to carry out any working operation which requires an inclined cutting to be made, the electronic control unit controls the movements of the working head 10, of the support and guide device 12 and of the feeding device 14 in the manner described below.

First of all, the support and guide device 12 is moved along the longitudinal axis x so as to reach a given position with respect to the working head 10, a position which is determined on the basis of criteria described in detail below. At this point, the working head 10 and the feeding device 14 (and with it the profile P being worked) are suitably moved so as to carry out the working operation provided for by the working cycle, in the present case the flared hole H. In particular, the feeding device 14, and therefore the profile P being worked, are suitably moved along the longitudinal axis x partly to compensate for the tilting movement of the working head about the axis of oscillation t and partly to obtain the desired geometry for the working operation. In this connection, Δx in FIG. 3 indicates the stroke of the feeding device 14 along the longitudinal axis x during the working operation. According to the invention, during the working operation the electronic control unit also controls the movement of the support and guide device 12 along the longitudinal axis x integrally with the movement of the feeding device 14, said integral movement of the support and guide device 12 with the feeding device 14 being limited to that portion of the movement of the feeding device 14 which is required to compensate for the tilting movement of the working head 10 about the axis of oscillation t. During those stages of the working operation in which the feeding device 14, and therefore the profile P being worked, are moved along the longitudinal axis x to compensate for the tilting movements of the working head 10 about the axis of oscillation t, there is therefore no relative movement along the longitudinal axis x between the profile P being worked, which is fixed longitudinally with respect to the feeding device 14, and the support and guide device 12. Consequently, the extent of the projection (indicated A in FIG. 4) of the profile P being worked from the support and guide device 12 is kept constant during these stages of the working operation. In FIG. 3 the stroke of the support and guide device 12 along the longitudinal axis x during the working operation is indicated $\Delta x_1$ and coincides with the stroke $\Delta x$ of the feeding device 14. When, however, the feeding device 14 is moved along the longitudinal axis x to obtain the desired geometry for the working operation, there is necessarily a relative movement between the profile P being worked and the support and guide device 12.

As stated in the introductory part of the description, since the projection of the profile being worked from the support and guide device is kept constant during the working operation it is possible to keep constant, in case of relatively flexible profiles, the extent of the bending deformation (deflection) of the profile in the working area on which the working head is acting, and thus obtain a flaring which is symmetrical with respect to the axis of the hole (as shown in FIG. 5), contrary to the prior art described above. Furthermore, by measuring the extent of the bending deformation of the profile where the hole has to be made, it is possible to suitably compensate for this deformation during working and thus obtain a final geometry corresponding as closely as possible to the design geometry.

As regards the initial positioning (i.e. before the beginning of the proper working operation) of the support and guide device 12, it must be defined in such a way that during the working operation the support and guide device 12, in its longitudinal translation movement integral with that of the feeding device 14, always remains above a given safety distance (indicated L in FIG. 3), for example of at least 50 mm, from the working head 10, in order to avoid the risk of collisions with the latter. Depending, therefore, on the starting position of the feeding device 14 along the longitudinal axis x and on the value of the safety distance L, the electronic control unit of the machine will determine the longitudinal position at which to position the support and guide device 12 at the beginning of the work operation.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:
1. Machine for the laser working of profiles (P), comprising
 a working head (10) for emitting a focussed laser beam to carry out a working operation, such as in particular a cutting operation, on a profile (P) to be worked extending along a longitudinal axis (x), the working head (10) being translatable in a plane perpendicular to said longitudinal axis (x) and being also tiltable about an axis of oscillation (t) perpendicular to said longitudinal axis (x),
 a feeding device (14) for moving the profile (P) to be worked along said longitudinal axis (x),
 a support and guide device (12) for supporting and guiding the profile (P) to be worked as this latter is being fed during the working operation by the feeding device (14) towards the working head (10), the support and guide device (12) being translatable along said longitudinal axis (x), and
 an electronic control unit for controlling the movements of the working head (10), of the feeding device (14) and of the support and guide device (12) according to predetermined logics,
wherein the electronic control unit is arranged to control the movements of the feeding device (14) and of the support and guide device (12) along said longitudinal axis (x), while an inclined cutting operation is being carried out on the profile (P), such as in particular to make a flared hole (H), in such a manner that before starting the working operation the support and guide device (12) is positioned in a given starting position along said longitudinal axis (x) relative to the working head (10) and then, during the working operation, the support and guide device (12) is moved along said longitudinal axis (x) integrally with the feeding device (14), and hence integrally with the profile (P), said integral movement of the support and guide device (12) with the feeding device (14) being limited to that portion of the movement of the feeding device (14) which is required to compensate for tilting movements of the working head (10) about said axis of oscillation (t).

2. Machine according to claim 1, wherein the electronic control unit is arranged to calculate the starting position of the support and guide device (12) in such a manner that during the working operation the support and guide device (12), in its longitudinal translational movement integral with that of the feeding device (14), always remains at a distance from the working head (10) greater than a given safety distance (L).

3. Method for carrying out an inclined cutting operation, such as in particular for making a flared hole, on a profile (P) extending along a longitudinal axis (x), by means of a laser working machine,
 wherein the machine comprises
  a working head (10) for emitting a focussed laser beam on the profile (P) to be worked, the working head (10) being translatable in a plane perpendicular to said longitudinal axis (x) and being also tiltable about an axis of oscillation (t) perpendicular to said longitudinal axis (x),
  a feeding device (14) for moving the profile (P) to be worked along said longitudinal axis (x),
  a support and guide device (12) for supporting and guiding the profile (P) to be worked as this latter is being fed during the working operation by the feeding device (14) towards the working head (10), the support and guide device (12) being translatable along said longitudinal axis (x), and
  an electronic control unit for controlling the movements of the working head (10), of the feeding device (14) and of the support and guide device (12) according to predetermined logics,
 the procedure method comprising the steps of:
 a) before starting the working operation, positioning the support and guide device (12) in a given starting position along said longitudinal axis (x) relative to the working head (10), and
 b) during the working operation, moving the support and guide device (12) along said longitudinal axis (x) integrally with the feeding device (14), and hence integrally with the profile (P), said integral movement of the support and guide device (12) with the feeding device (14) being limited to that portion of the movement of the feeding device (14) which is required to compensate for tilting movements of the working head (10) about said axis of oscillation (t).

4. Method according to claim 3, wherein the starting position of the support and guide device (12) is determined in such a manner that during the working operation the support and guide device (12), in its longitudinal translational movement integral with that of the feeding device (14), always remains at a distance from the working head (10) greater than a given safety distance (L).

\* \* \* \* \*